United States Patent [19]

Klarer et al.

[11] Patent Number: 5,584,542
[45] Date of Patent: Dec. 17, 1996

[54] METHOD FOR CONTROLLING THE INITIATION SENSITIVITY OF AN AUTOMATIC BRAKING PROCEDURE

[75] Inventors: Martin Klarer, Kernen; Franz Brugger, Winnenden; Bernd Knoff, Esslingen; Albrecht Eckl, Stuttgart, all of Germany

[73] Assignee: Mercedes-Benz AG, Germany

[21] Appl. No.: 449,580

[22] Filed: May 24, 1995

[30] Foreign Application Priority Data

May 24, 1994 [DE] Germany .......................... 44 18 043.8

[51] Int. Cl.$^6$ ...................................... B60T 7/06
[52] U.S. Cl. ...................... 303/155; 303/125; 303/113.4
[58] Field of Search .................................. 303/155, 125, 303/113.4

[56] References Cited

U.S. PATENT DOCUMENTS

| | | | |
|---|---|---|---|
| 4,494,199 | 1/1985 | Lehmann | 303/155 |
| 5,158,343 | 10/1992 | Reichelt et al. | 303/113.4 |
| 5,350,224 | 9/1994 | Nell et al. | |
| 5,350,225 | 9/1994 | Steiner et al. | |
| 5,367,942 | 11/1994 | Nell et al. | |
| 5,445,444 | 8/1995 | Rump et al. | |

FOREIGN PATENT DOCUMENTS

| | | |
|---|---|---|
| 4325940C1 | 12/1984 | Germany . |
| 4028290C1 | 1/1992 | Germany . |
| 4102496 | 2/1992 | Germany . |
| 4102497 | 5/1992 | Germany . |
| 4329139 | 7/1994 | Germany . |
| 4325940 | 12/1994 | Germany . |
| 4335769 | 12/1994 | Germany . |
| 4329140 | 12/1994 | Germany . |
| 4406128 | 2/1995 | Germany . |
| 4338070 | 2/1995 | Germany . |
| 4338069 | 3/1995 | Germany . |
| 4338068 | 3/1995 | Germany . |
| 4413172 | 3/1995 | Germany . |
| 4338067 | 3/1995 | Germany . |
| 4338064 | 3/1995 | Germany . |
| 4338065 | 5/1995 | Germany . |
| 4418043 | 7/1995 | Germany . |
| 5-294218 | 11/1993 | Japan .......................... 303/125 |

Primary Examiner—Matthew C. Graham
Attorney, Agent, or Firm—Evenson, McKeown, Edwards & Lenahan P.L.L.C.

[57] ABSTRACT

The invention relates to a method for defining the initiation sensitivity of an automatic braking procedure, in which method the threshold value for the initiation of an automatic braking procedure is reduced as a function of the pedal distance which has been traversed. The object of the invention is to ensure that in the event of actuation of the brake shortly after the automatic braking procedure has terminated, the automatic braking procedure is again initiated rapidly and easily. For this purpose, the initiation threshold value for the automatic braking procedure is reduced within a time period after the satisfaction of the interruption criterion.

13 Claims, 1 Drawing Sheet

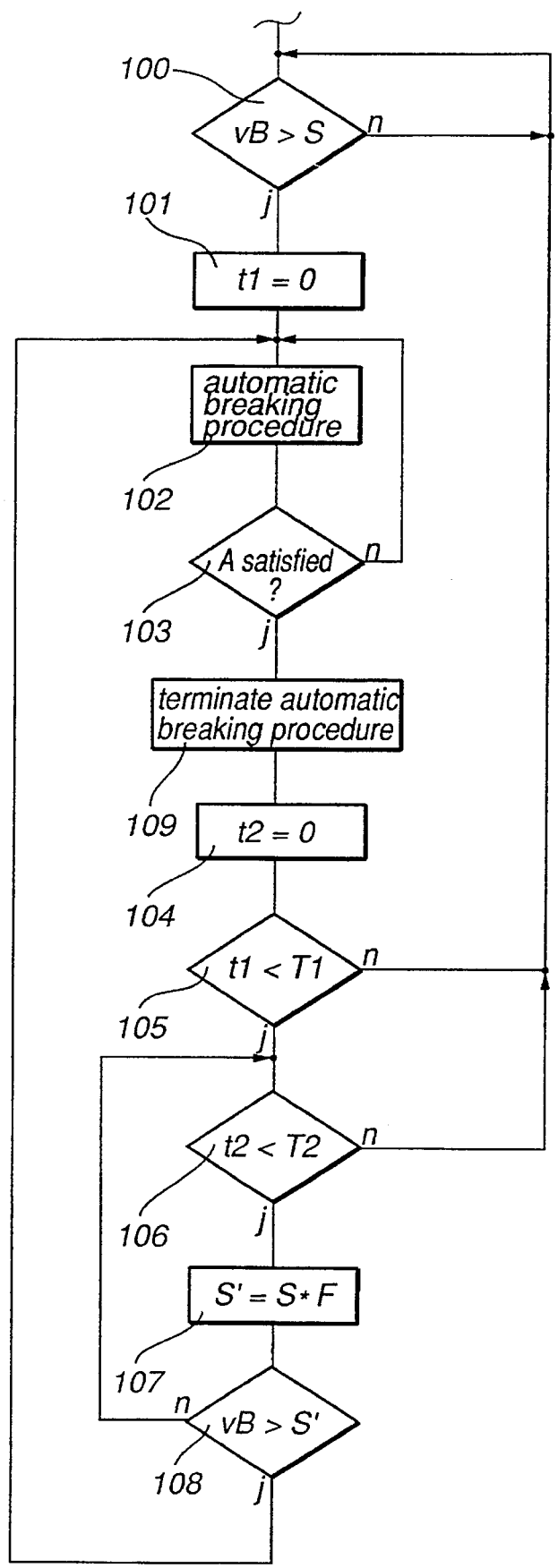

METHOD FOR CONTROLLING THE INITIATION SENSITIVITY OF AN AUTOMATIC BRAKING PROCEDURE

BACKGROUND AND SUMMARY OF THE INVENTION

The invention relates to a method for controlling the initiation sensitivity of a vehicle automatic braking procedure based on actuation speed of the vehicle brake pedal otherwise known as panic braking.

For example, German patent application DE 43 25 940 C1, which is not a prior publication, discloses a process which reduces the threshold value for the initiation of automatic braking as a function of the distance traversed by the brake pedal. For this purpose, a fixed specified initiation threshold value S is multiplied by a factor which is determined from a characteristic diagram.

German patent document DE 40 28 290 C1 discloses a basic automatic braking procedure in which a brake pressure greater than that corresponding to the position of the brake pedal is generated.

In emergency situations, the driver may react correctly at first and actuate the brake energetically, initiating the basic automatic braking procedure. It often happens, however, due to shock at the energetic reaction of the vehicle or due to an erroneous estimate of the situation, that the correct initial reaction is followed briefly by an at least partial release of the brake or by a partial braking position being retained, which can lead to the satisfaction of an interruption criterion for the automatic braking procedure according to the prior art. Under certain circumstances, renewed brake pedal actuation after automatic braking is thus terminated does not then reliably lead to renewed initiation of the automatic braking procedure.

The object of the present invention is to ensure, in such situations, that the automatic braking process is initiated rapidly and reliably upon renewed actuation of the brake pedal.

The object is achieved according to the invention by reducing the initiation threshold value for the automatic braking process during a time period after the satisfaction of the interruption criterion.

Other objects, advantages and novel features of the present invention will become apparent from the following detailed description of the invention when considered in conjunction with the accompanying drawings.

BRIEF DESCRIPTION OF THE DRAWINGS

The single figure of the drawing shows a flow diagram of a method according to the present invention.

DETAILED DESCRIPTION OF THE DRAWING

In step 100 a check is made whether the actuation speed vB of the brake pedal exceeds an initiation threshold value S for the initiation of the automatic braking procedure, and if not, the check of this criterion in step 100 is repeated. As soon as the actuation speed vB exceeds the initiation threshold value S, however, a time counter for the time t1 is reset to zero and restarted in step 101, and automatic braking is carried out in accordance with step 102. During the automatic braking process, full operation of the brake servo-unit is selected by means of an electrical value and a corresponding brake pressure is generated. The detailed course of the braking procedure is well known and is described, for example, in German patent document DE 40 28 290 C1.

Step 103 checks whether an interruption criterion A is satisfied. If not, the process returns to step 102 and the automatic braking procedure is continued. For this purpose, for example, a suitable interruption criterion A may be a withdrawal of the brake pedal toward its unactuated rest position; alternatively, the attainment of the unactuated rest position of the brake pedal may be used.

If it is found in step 103, however, that the interruption criterion A is satisfied, automatic braking is terminated at step 109, and a time counter t2 is reset to zero and restarted in step 104. Step 105 then checks whether the time t1 measured since the beginning of the braking procedure is greater than the time period T1. If so, the process returns to step 100. In this case, the initiation threshold value S remains unaltered for the subsequent initiation of the automatic braking procedure. The time period T1 is, for example, specified as a fixed quantity and can assume values up to 5 seconds. Preferably, T1=3seconds.

If it is found in step 105 that the time period T1 has not elapsed since the beginning of the automatic braking procedure, step 106 checks whether the time interval T2 has elapsed since the interruption criterion A was satisfied. The time interval T2 is, for example, specified as a fixed quantity. It can be between 0 and 5 seconds, and is preferably approximately 2 seconds.

If the time interval T2 has elapsed in step 106, the process returns to step 100. Otherwise, the initiation threshold value S is multiplied by the factor F in step 107, so that a reduced threshold value S', which is only temporarily valid, is obtained. The factor F can be a fixed specified value, between 0.4 and 0.8, for example, or it can be defined as a function of the time t1 which has elapsed since the beginning of the automatic braking procedure or of the time t2 which has elapsed since the satisfaction of the interruption criterion A. In the latter cases, the factor F becomes greater as more time elapses, so that the temporarily valid initiation value S' is slowly matched to the specified threshold value S. (The threshold value S itself may be either specified as a fixed quantity, or it may be determined from characteristic diagrams as a function of a driving condition or a vehicle condition.)

Step 108 checks whether the actuation speed of the brake pedal vB is greater than the temporarily valid threshold value S'. If so, processing returns to step 102. A new automatic braking procedure is thus carried out, but the time t1 is not reset. If, however, renewed brake pressure has not been reapplied in excess of S', processing returns to step 106, and steps 106, 107 and 108 are repeated.

The fact that the initiation of two sequential but independent braking maneuvers are reliably dealt with by the same initiation criterion associated with the recognition of an emergency braking operation is relevant to the duration of the time period T1 and the time interval T2. On the other hand, a further automatic braking procedure, which depends on a first automatic braking procedure which has been terminated in the meantime, should be carried out rapidly and reliably. For this reason, the optimum duration of the time period T1 and of the time interval T2 must be determined as a function of the vehicle and its behavior.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for controlling the initiation sensitivity of a vehicle automatic braking process of the type wherein, when a first initiation threshold value for the actuation speed of a vehicle brake pedal is exceeded, a brake pressure higher than that which corresponds to a position of the brake pedal is generated during the automatic braking procedure, and wherein automatic braking is terminated when an interruption criterion is satisfied, said method comprising:

detecting a termination of an automatic braking procedure;

measuring a predetermined time interval commencing upon termination of said automatic braking procedure;

after said termination of said automatic braking procedure, providing a second initiation threshold value for initiation of automatic braking during said predetermined time interval, said second initiation threshold value being smaller than said first initiation threshold value.

2. Method according to claim 1 wherein said second initiation threshold value is provided only if the interruption criterion is satisfied within a first time interval after satisfaction of the initiation criterion.

3. Method according to claim 2 wherein the second initiation threshold value is provided only if the predetermined time interval has not yet elapsed since the satisfaction of the interruption criterion, at a point in time when the first time interval has not yet elapsed since the satisfaction of the initiation criterion.

4. Method according to claim 2 wherein the second initiation threshold value is reduced by a factor relative to said first initiation threshold value.

5. Method according to claim 4 herein the factor has a value between 0.4 and 0.8.

6. Method according to claim 4 wherein the factor has the value of 0.5.

7. Method according to claim 4 wherein the factor is a function of the time elapsed since one of: satisfaction of the interruption criterion, and satisfaction of the initiation criterion.

8. Method according to claim 2 wherein the first time interval is between 0 and 5 seconds.

9. Method according to claim 8 wherein said length of the first time interval is a function of one of vehicle speed and vehicle deceleration during the braking procedure.

10. Method according to claim 1 wherein the length of the predetermined time interval is between 0 and 5 seconds.

11. Method according to claim 10 wherein the length of the predetermined time interval is a function of one of vehicle speed and vehicle deceleration during the braking procedure.

12. Method according to claim 1 wherein a withdrawal of the brake pedal in the direction of its unactuated rest position is employed as the interruption criterion.

13. Method according to claim 1 wherein the attainment of the unactuated rest position by the brake pedal is employed as the interruption criterion.

* * * * *